US005478985A

United States Patent [19]

Hoetzl et al.

[11] Patent Number: 5,478,985

[45] Date of Patent: Dec. 26, 1995

[54] HEAT TREAT FURNACE WITH MULTI-BAR HIGH CONVECTIVE GAS QUENCH

[75] Inventors: Max Hoetzl, Toledo; Daniel E. Goodman, Perrysburg, both of Ohio

[73] Assignee: Surface Combustion, Inc., Maumee, Ohio

[21] Appl. No.: 123,800

[22] Filed: Sep. 20, 1993

[51] Int. Cl.$^{6}$ .................... A21B 1/26

[52] U.S. Cl. .................... 219/400; 126/21 A; 373/113; 432/176

[58] Field of Search .................... 219/400; 432/77, 432/144, 152, 176, 177, 200, 202; 373/110, 112, 113, 109, 118, 127; 126/21 A; 99/447; 416/184, 199

[56] References Cited

U.S. PATENT DOCUMENTS

| | | | |
|---|---|---|---|
| 3,565,410 | 2/1971 | Scherff | 266/5 |
| 3,620,513 | 11/1971 | Wernicke | 263/4 |
| 4,094,631 | 6/1978 | Grieve | 432/176 |
| 4,516,012 | 5/1985 | Smith et al. | 219/400 |
| 4,648,377 | 3/1987 | VanCamp | 432/176 |
| 4,722,683 | 2/1988 | Royer | 432/152 |
| 4,836,776 | 6/1989 | Jomain | 432/176 |
| 4,867,132 | 9/1989 | Yencha | 432/176 |
| 4,867,808 | 9/1989 | Heilmann et al. | 148/20.3 |
| 4,906,182 | 3/1990 | Moller | 432/77 |
| 4,963,091 | 10/1990 | Hoetzl et al. | 432/176 |
| 5,074,782 | 12/1991 | Hoetzl et al. | 432/176 |

*Primary Examiner*—Bruce A. Reynolds
*Assistant Examiner*—Tu Hoang
*Attorney, Agent, or Firm*—Frank J. Nawalanic

[57] ABSTRACT

An improved cooling arrangement is disclosed for an industrial heat treat furnace. The furnace includes a closed end cylindrical heat treat chamber in which a plenum plate is suspended adjacent the rear end thereof. The plenum plate has a central underpressure opening and a fan between the rearward end of the furnace and the plate develops a wind mass which circulates into the furnace chamber and is drawn back into the fan through the plate central underpressure opening. Between the plenum plate and the furnace rearward end is positioned a first fixed fan diffuser followed by a second fixed fan diffuser. The first fan diffuser permits wind mass flow therethrough when the fan is rotated in a first direction but not in a second direction and similarly the second fan diffuser permits wind mass flow therethrough when the fan is rotated in a second direction but not in a first direction. A cooling coil arrangement is placed adjacent the second fixed fan diffuser to permit accurate control of the cooling of the work by simply cycling fan rotation direction from clockwise to counterclockwise.

26 Claims, 4 Drawing Sheets

HEAT TREAT FURNACE WITH MULTI-BAR HIGH CONVECTIVE GAS QUENCH

This invention relates generally to industrial heat treat furnaces for performing heat treat processes on metal articles and more particularly to a method and apparatus used in heat treat furnaces which results in improved heat transfer with the work.

The invention is particularly applicable to and will be described with specific reference to a high temperature, vacuum furnace. However, it will be appreciated by those skilled in the art that the invention has broader applications and is applicable to both high and low temperature heat treat furnaces.

INCORPORATION BY REFERENCE

The following patents are incorporated by reference herein and made a part hereof:

Hoetzl et al, U.S. Pat. No. 4,963,091, dated Oct. 16, 1990, entitled "Method and Apparatus for Effecting Convective Heat Transfer in a Cylindrical Industrial Heat Treat Furnace".

Hoetzl et al, U.S. Pat. No. 5,074,782, dated Dec. 24, 1991, entitled "Industrial Furnace with Improved Heat Transfer".

The patents are incorporated as background material so that the description of the invention herein need not define what is conventionally known in the art. The Background Patents do not form part of the present invention.

BACKGROUND

Until the development by Surface Combustion, Inc. (the assignee of the present invention) of the Unidraw™ and the Vacudraw™ furnaces described, respectively, in the '091 and '782 Background Patents, furnace atmosphere heat transfer with the work (principally for cooling) was achieved in heat treat furnaces by complicated baffle arrangements. Whether the baffles were moveable or not, such arrangements produce, at best, heat transfer patterns with the work which are sensitive and difficult to accurately control. Examples of prior art attempts to develop improved heat transfer arrangements with improved wind mass flows about the work can be seen in Jomain U.S. Pat. No. 4,836,776 and Moller U.S. Pat. No. 4,906,182. The inventive concepts disclosed however in the '091 and '782 Background Patents, however, utilize a very simple recirculating wind mass scheme which obviates the needs of baffles, movable injection ports, two fan systems, etc. in a simple, low cost furnace construction. The present invention can be viewed as an improvement to the inventions disclosed in the '091 and '782 Background Patents, and one that is especially suited for high temperature applications.

In high temperature applications where the work is heated above 1200° F. typically in the range of 1900°–2050° F., coolant such as water cannot be initially introduced into a "hot" cooling coil situated in the furnace without causing thermal shock and failure of the cooling coil. Thus, in those high temperature applications where the work has to be quickly cooled initially from a high temperature, the VacuDraw furnace had difficulty because a cool gas had to be initially used. Furthermore, several heat treat processes such as marquenching or austempering require that the quench be interrupted after initial cooling to relieve grain size, prevent part deformation etc. Performing interrupted quenching in the prior art arrangements was difficult to achieve.

SUMMARY OF THE INVENTION

Accordingly, it is a principal object of the present invention to provide in a heat treat furnace using a convective heat transfer arrangement such as disclosed in the Background Patents, a mechanism which permits precise control of the convective heat transfer rate with the work.

This object along with other features of the present invention is achieved in an industrial heat treat furnace which includes an elongated heat treat chamber defined by furnace walls into which work to be heat treated is placed with the heat treat chamber having a forward end and a closed rearward end. A plenum plate is suspended within the heat treat chamber adjacent the rearward end to define a plenum chamber extending between the plate and the rearward end. The plenum plate has a central underpressure opening and an outer edge spaced inwardly from the furnace circumferential wall to define an exit space therebetween so that the central opening and the exit space are in fluid communication with both the plenum chamber and the heat treat chamber. A fan is positioned within the plenum chamber adjacent the central opening and a motor rotates the fan clockwise and counter clockwise for creating a wind mass swirling in a first direction and in a second opposite direction. A first stationary fan diffuser mechanism is placed adjacent the plate and directs the wind mass through the first diffuser mechanism and out of the plenum chamber through the exit space when the fan rotates in the first direction while preventing the wind mass from travelling through the first diffuser mechanism when the fan rotates in the second direction. A second stationary fan diffuser mechanism is placed within the plenum adjacent the rearward end for directing the wind mass from the plenum chamber through the exit space when the fan rotates in the second direction while preventing the wind mass from travelling through the second diffuser mechanism when the fan rotates in the first direction. Thus, depending on the direction of fan rotation, the wind mass can be selectively channeled through either the first or the second diffuser mechanisms for impingement against the work in a conventional way. Accordingly, the furnace is provided with a heat. source and a cooling mechanism either of which is selectively actuated by simply controlling the fan rotational direction thus avoiding any need for internal baffles, moving injection ports or two-fan systems which would otherwise be required to separately achieve heating and cooling of the work.

In accordance with another aspect of the invention, the first diffuser mechanism includes a plurality of first vanes spaced at circumferential increments about the underpressure opening and extending longitudinally a fixed distance from the plenum plate. Each first vane extends radially outwardly in a first direction from the circumference cf an imaginary circle which is concentric with the edge of the circular underpressure opening to form, as between any pair of adjacent first vanes, a first diffuser vane passageway. Each first vane passageway increases in area as the vane passageway extends radially outwardly from the imaginary circle. Thus, the wind mass flows through and out of each first vane passageway when the fan is rotated in the first direction which coincides with the first vanes' first direction while the wind mass is blocked from flowing through the first vane passageways when the fan is rotated in the second opposite direction. Similarly, the second diffuser mechanism includes a plurality of second vanes spaced at circumferential increments about the underpressure opening and extending longitudinally a fixed distance from the rearward end to the first vanes. Each second vane extends radially outwardly from the circumference of the imaginary circle in a second direction opposite to that of the first vane's first direction so that a second diffuser vane passageway is formed between any pair of adjacent second vanes. Each second vane passageway increases in area as the second vane passageway extends radially outwardly from the imaginary circle. The wind mass thus flows through the second vane passageways when the fan is rotated in the second direction which coincides with the second vanes' second direction while the wind mass is blocked from flowing through the second vane passageways when the impeller is rotated in the first direction. Each diffuser thus effectively operates as a one-way check valve.

In accordance with yet another aspect of the invention at least one manifold is connected to the outlets of several second vane passageways with the manifold extending radially outwardly from the second vane passageways and longitudinally a distance approximately equal to that of the second vanes. Within the manifold is placed at least one cooling coil over which the wind mass must flow when the fan is rotated in the second direction whereby the temperature of the wind mass is lowered to achieve cooling of the work in the heat treat chamber. Importantly, because the wind mass travels through the first diffuser during heating, coolant can flow continuously through the cooling coil in the second diffuser while the work is heated. Thus the cooling coil is not subject to thermal shock when the wind mass direction is changed to flow through the second diffuser. Rapid cooling from temperatures as high as 2100° F. is thus possible in a simple arrangement which does not require heat exchangers, fans and the like situated outside the furnace.

In accordance with another aspect of the invention, a process for heat treating metal work is disclosed which process occurs in a cylindrical heat treat furnace as described above. The process includes the steps of providing first and second fixed fan diffusers as described above and rotating the fan in the first direction while actuating the heat mechanism. Thus, the wind mass flows through the first diffuser while blocked from entry into the second diffuser. The pressure of the wind mass caused by the rotation of the fan is sufficient to cause the wind mass to pass through the annular space between the circumferential edge of the plate and the furnace circumferential wall and enter into the heat treat chamber and convectively heat work therein to a temperature of about 1000°–1200° F. and to be thereafter withdrawn from the heat treat chamber by exiting therefrom through the central opening in the plate. Thereafter, the process includes rotating the fan in the opposite second direction to cause the wind mass to flow through the second diffuser while being blocked from flowing through the first diffuser. The wind mass passes over the cooling coils when leaving the second diffuser and is cooled thereby. The pressure of the wind mass caused by the rotation of the fan is sufficient to cause the cooled wind mass to pass through the annular exit space and enter into the heat treat chamber and to be withdrawn therefrom through the central opening to achieve high cooling rates in the work. In accordance with a specific feature of the invention the cooling rate is controlled by stopping and switching the direction of rotation of the fan. The convective heating rate can similarly be suspended or interrupted.

In accordance with yet another feature of the invention the process contemplates radiantly heating the work to temperatures as high as 2000°–2200° F. after the work has been convectively heated to its temperature of about 1000°–1200° F. Prior to convectively heating the work, the process includes drawing a vacuum within the heat treat chamber followed by backfilling the heat treat chamber with an inert gas while allowing the vacuum within the heat treat chamber to be reduced to levels up to atmospheric pressures of about 1 bar absolute whereat the convective heating step is accomplished. The heat treat chamber is then evacuated to some vacuum level whereat the work is radiantly heated to the high temperature range of 2000°–2200° F. Thereafter, and importantly, the heat treat chamber is backfilled with an atmosphere gas injected under a significantly high pressure which can be as high as 10 bar absolute. At this pressure the gas, in effect, is ten times heavier than gas at standard atmospheric pressure. In fact, the fan motor size is such that when the gas is pressurized at 10 bar, the fan starts slowly and its speed variably increases. Importantly, the high gas pressure produces a dense gas which produces significantly high cooling rates at fan speeds which can be viewed as moderate and variable. Thus, the arrangement is ideal for interrupted quenches where the fan speed can be readily switched. Still further, the internal multi-bar gas pressures can be adjusted to vary the density of the gas and the cooling or heating rates accordingly.

In accordance with yet another aspect of the invention, there is provided in a heat treat furnace for heat treating metal work a fan diffuser arrangement comprised of a first and second fixed fan diffuser situated between a plenum plate and the end of the furnace as described above. The fan diffuser can be thus easily applied or retro fitted to existing furnaces.

It is yet another feature of the invention to include within the heat treat chamber a plurality of curved graphite heating elements connected to one another to form a continuous circle which is positioned to surround and be equidistantly spaced about the work. A plurality of graphite heating element circles are provided at somewhat equally spaced longitudinal increments along the heat treat chamber. Each graphite heating element circle can be electrically connected to one another or preferably, only adjacent circles can be electrically connected to one another to provide longitudinal, heat regulated zones. No matter which electrical connection is used, an improved, uniform radiant heat distribution pattern is imparted to the work which does away with the necessity of inner radiation liners or covers.

It is thus an object of the invention to provide a convective heating and cooling arrangement for use in an industrial heat treating furnace which eliminates the need for fixed or moving internal baffles, fixed or moving injection ports, or separate two fan systems thus resulting in a simple and efficient convective heat transfer arrangement.

It is yet another object of the invention to provide in an industrial heat treat furnace, a mechanism for gas quenching or cooling the work at high convective heat transfer rates.

Yet another object of the invention is to provide a method for heat treating work in an industrial vacuum heat treating furnace wherein gas quenching is employed for those heat treat processes requiring an interrupted quench.

It is still yet another object of the invention to provide a convective heating/cooling arrangement which can be selectively actuated and which achieves uniform heat transfer with the work.

Still yet another object of the invention is to provide a high temperature industrial heat treat furnace employing convective, selectively actuated, heating and cooling mechanisms while also achieving uniform high temperature radiant heat transfer to the work by virtue of the configuration of the electrical heating elements therein.

Still yet another object of the invention is to provide a low cost, vacuum heat treating furnace which utilizes convective heating and cooling in a hot walled furnace construction which obviates the need of a double wall, water jacket construction.

It is yet another object of the invention to provide an industrial heat treat furnace and method of operation which permits gas quenching for marquenching, austempering and like processes in a wide variety of processes.

A still further object of the invention is to provide a multibar furnace in a simple, cost-efficient hot wall furnace construction.

Still another object of the invention is to provide method and apparatus for quenching heavy mass work objects subjected to heat treat processes requiring an interrupted quench without distorting the work.

Still yet another important object of the invention is to utilize gas quenching to achieve high cooling rates (and similarly high convective heating rates) by densifying the gas and varying the density of the gas during cooling to achieve variable quench rates and/or interrupted quenches. Still further, the density of the atmosphere can be variably controlled in combination with selective fan speed and rotation to achieved high convective heating rates.

These and other objects and advantages of the invention will become apparent from a reading of the Detailed Description section bellow taken together with the drawings which will be described as follows.

BRIEF DESCRIPTION OF THE DRAWINGS

The invention may take physical form in certain parts and arrangement of parts, s preferred embodiment of which will be described in detail and illustrated in the accompanying drawings which form a part hereof and wherein.

DETAILED DESCRIPTION OF THE INVENTION

Figure 1:
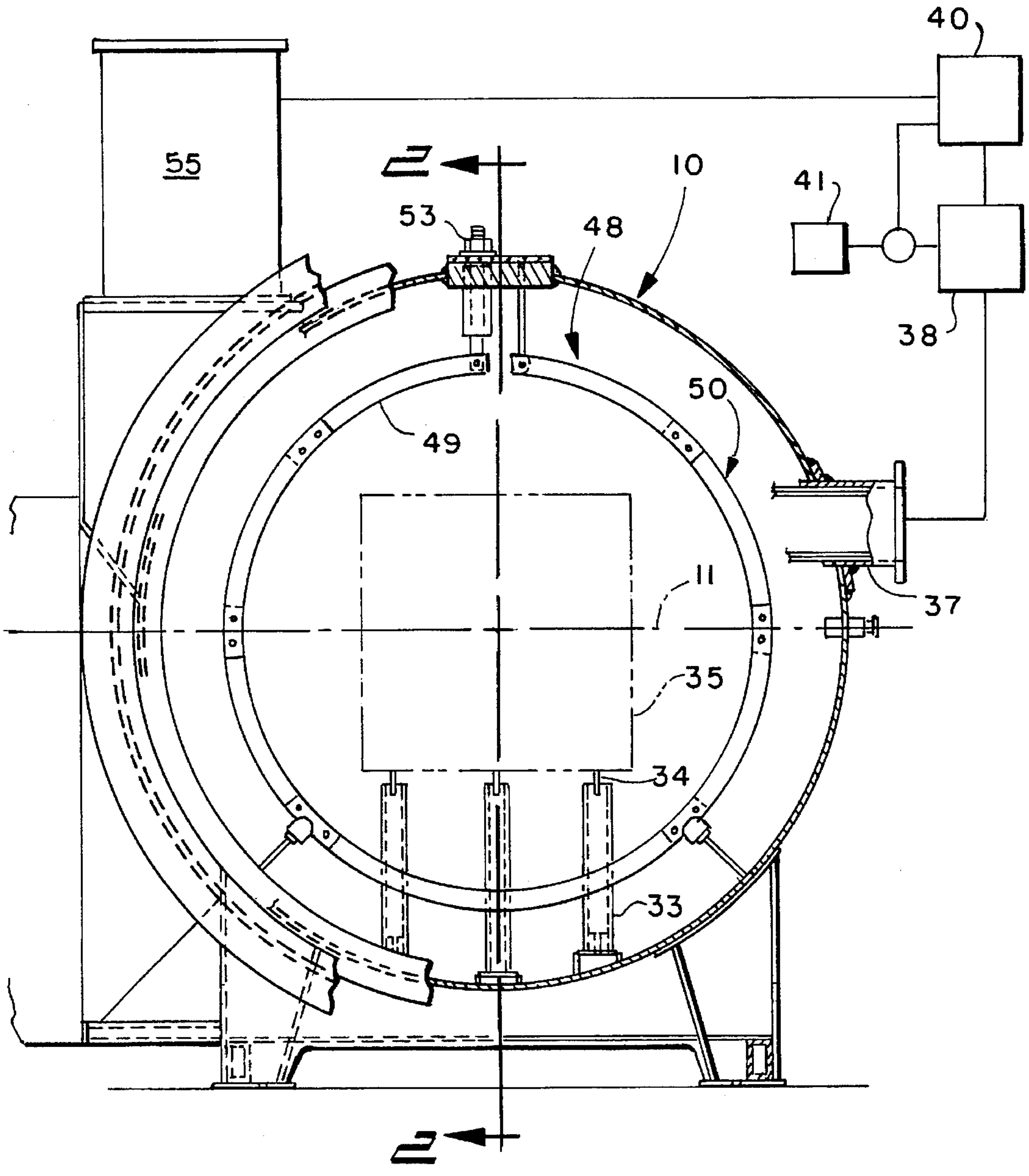
FIG. 1 is a schematic end view of the furnace of the present invention.
Figure 2:
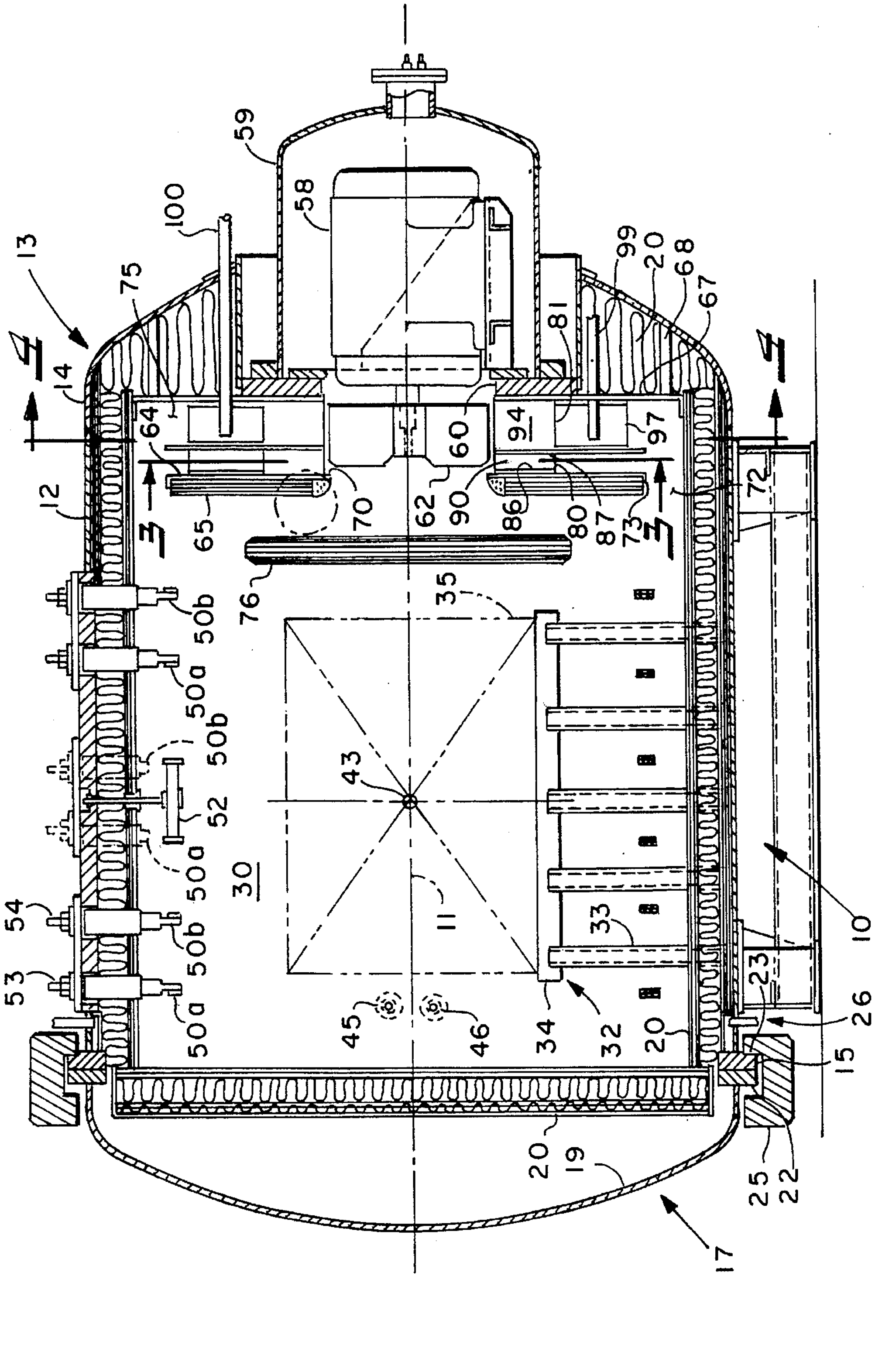
FIG. 2 is a longitudinally sectioned, schematic view of the furnace of the present invention taken along lines 2—2 of FIG. 1.

Referring now to the drawings wherein the showings are for the purpose of illustrating a preferred embodiment of the invention only and not for the purpose of limiting the same, there is shown in FIGS. 1 and 2 an industrial heat treat furnace 10. Furnace 10 is of a conventional hot wall construction and is intended to be operated at high temperatures i.e. temperatures as high as 2000°–2200° F. Furnace 10 includes a cylindrical casing 12 having a rearward end 13 to which is welded a hemispherical rearward casing 14. Cylindrical casing 12 also has an open forward end 15 which receives a spherical shaped door assembly 17 in a sealable manner.

Door assembly 17 is somewhat conventional and is not shown in detail. For example, a conventional door assembly sold by Surface Combustion, Inc., the assignee of the present invention, under the trade name Autoclave can be employed. For purposes of discussion, door assembly 17 includes hemispherical door casing 19 carrying a flat insulated composition board 20 which basically closes forward end 15. Sealing is obtained by contact between an annular ring 22 carried on door casing 19 mating against a similar annular ring 23 carried at cylindrical casing's forward end 15. An elastomer seal (not shown) between the rings can be compressed and the door is sealed by wedges (not shown) inserted into the space between a U-shaped retainer ring 25 and door annular ring 22. U-shaped retainer ring 25 is a split ring which can open up to allow pivoting retraction of door assembly 17. A small annular water jacket 26 is provided for cooling the seal between door annular ring 22 and cylindrical casing annular ring 23.

All furnace casings 12, 14, and 19 are conventional structural plates (plain, cold rolled steel) approximately 3/16" to 3/4" thick. Secured to the interior of casings 12 and 14 is a vacuum-formed ceramic fibre insulation 28 of relative high density i.e. 15 lb/in$^2$. Furnace 10 also employs other conventional insulation material arranged in a series of boards, graphite and microtherm. All such material is conventionally known and readily available in the trade and is thus not shown or described further in detail herein. Insulation 28 is secured to casing 12, 14 in a conventional manner. It will also be readily appreciated by those skilled in the art that other types of conventional fibrous furnace insulation such as fibrous boards, ceramic brick, etc. can be applied. Cylindrical casing 12, rearward casing 14 and door assembly 17 with insulation 20 attached to the interior thereof forms a closed-end cylindrical heat treat chamber 30 and it is to be understood that the exposed, inwardly facing edge surfaces of insulation 20 is relatively rigid and hard. As thus far described, furnace 10 is conventional.

Extending within heat treat chamber 30 is a conventional hearth 32 which includes conventional vertically extending posts 33 supporting longitudinally extending rails 34 which in turn support metallic work indicated by the phantom lines designated by reference numeral 35 shown in FIGS. 1 and 2. A port 37 is provided in cylindrical casing 12 which in turn is connected to a vacuum pump schematically shown at reference numeral 38 which is under the control of a microprocessor controller schematically shown by reference numeral 40. Also connected to pump port 37 and under the control of microprocessor controller 40 is a pressurized source of process gas 41 which is an inert gas such as nitrogen and its functions will be described hereafter. For ease of explanation, it is to be assumed that pump port 37 can function as a vent to regulate furnace pressure when heat treat chamber 30 is placed under a positive multi-bar pressure as high as 10 bar while also functioning as a suction port for drawing a vacuum within heat treat chamber by pump 38. Also connected as inputs to microprocessor controller 40 is a work load thermocouple 43 embedded within the work zone of work 35, a furnace control thermocouple 45 and various survey thermocouples 46 which sense the temperature within heat treat chamber 30.

Furnace 10 employs an electric, resistance heating element configuration 48 which imparts an excellent, uniform radiant heat flux to work 35. Electric resistance heating configuration includes a plurality of curved graphite heating element segments 49 interconnected to one another to form a graphite ring 50 concentric with the center of work 35. There are six (6) rings in the preferred embodiment. Each pair of graphite rings 50*a*, 50*b* are electrically connected to each other by a graphite connector rod 52 (FIG. 2). Each set of two rings, for example 50*a*, 50*b*, has an AC voltage potential connected across the inlet and outlet terminals 53, 54. Thus in the preferred embodiment there are three (3) sets of rings 50*a*, 50*b* for controlling 3 longitudinally spaced zones of heat to work 35. Alternatively, all rings 50 could be interconnected to one another to give one heat zone. As best shown in FIG. 2, rings 50 are spaced in somewhat equal longitudinal increments along the length of the work. Because work 35 is centered on furnace centerline 11 graphite rings 50 are not only concentric with work 35 but significantly, they are concentric with insulation 20 of heat treat chamber 30. Thus heat flux is not only radiated to work 35 but it is also radiated uniformly to insulation 20 and to each adjacent heating element which in turn radiates heat flux uniformly back to work 35 resulting in a heating arrangement which at the high end (2000°–2200° F.) is able to establish consistent heat temperatures throughout work 35. In conventional, cold walled vacuum furnaces, inner liners or radiation shields are employed to radiate the heat back to the work.

Referring now to FIG. 2, a fan motor 58 within fan housing 59 is sealingly mounted in an insulated manner to a central opening 60 formed in rearward casing 14. Secured to fan motor 58 is a radial fan 62 centered on furnace centerline 11. A radial fan 62 is preferred although other fan designs can be used.

Suspended within heat treat chamber 30 is a plenum plate 64 and because of the high temperature furnace application, that side of plenum plate 64 facing furnace forward end 15 has an insulation board arrangement 65 fastened thereto. Plenum plate 64, like other structural members used in the fan arrangement, is secured to rearward casing 14 by longitudinally extending rods (not shown) which are attached to a circular end plate 67 which in turn is secured to rearward casing 14 by studs 68. Plenum plate 64 is circular in configuration and is concentric with furnace centerline 11 and has an underpressure central opening 70 which functions for the purpose and the manner described in the Background Patents noted above. There is thus an annular exit space designated by reference numeral 72 existing between the outer edge surface 73 of plenum plate 64 and the inner surface of insulation 20 forming heat treat chamber 30 through which wind mass developed by fan 62 travels into heat treat chamber 30. For definitional purposes, within heat treat chamber 30 there is formed an annular plenum chamber 75 longitudinally extending between plenum plate 64 and circular end plate 67. Also, provided in furnace 10 is a radiation barrier plate 76 which is circular in configuration and concentric with furnace center line 11. Barrier plate 76 functions to cause or break up the return flow of the wind mass to underpressure central opening 70 so that the return wind mass impinges barrier plate 76 and travels along its face to pass into the underpressure central opening 70 by flowing between plenum plate 64 and barrier plate 76. As thus far described, furnace 10 can be operated in the manner described in the '091 and '782 Background Patents. More particularly depending upon the speed of rotation of fan 62, a wind mass can be generated within plenum chamber 75 which is forced out of plenum chamber 75 through exit space 72 and travels as a swirling mass along the length of heat treat chamber 30. Depending upon the fan speed and accordingly wind mass pressure either layers of the wind mass can be successively stripped therefrom as described in the '091 patent or, the wind mass can remain substantially intact until impacting door assembly 17 as described in the '782 patent. In either mode of operation the spent wind mass (spent in the sense of heat transfer having been effected with work 35) is returned to plenum chamber 75 through the underpressure created by rotation of fan 62 at underpressure opening 70. Reference should be had to the '091 and '782 Background Patents for more complete explanations of the heat transfer with work 35 effected by the fan arrangement disclosed herein. In the preferred embodiment, the rotation direction of fan 62 is under the control of microprocessor 40. Also, well within the scope of the present invention is that microprocessor 40 controls the speed of fan 62 rotation so that both wind mass patterns disclosed in the Background Patents can be practiced with the present invention. However, unlike the Background Patents, and as will be shortly explained, the wind recirculation patterns have been observed to occur in the present invention even though the pressure of the gas within heat treat chamber 30 is at high multi-bar pressures.

THE FAN DIFFUSER

Figure 3:
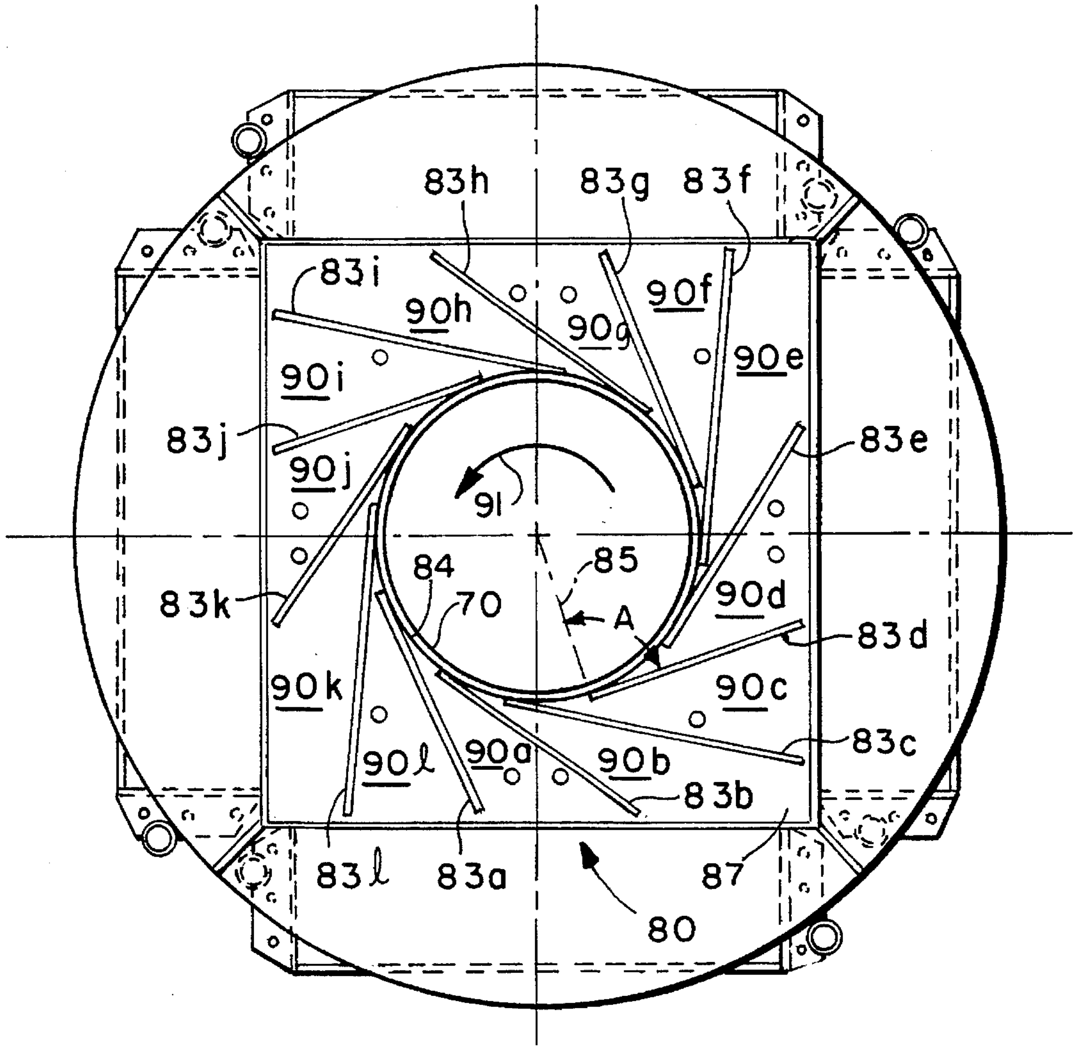
FIG. 3 is a cross-sectioned view of the diffuser of the present invention taken along lines 3—3 of FIG. 2.
Figure 4:
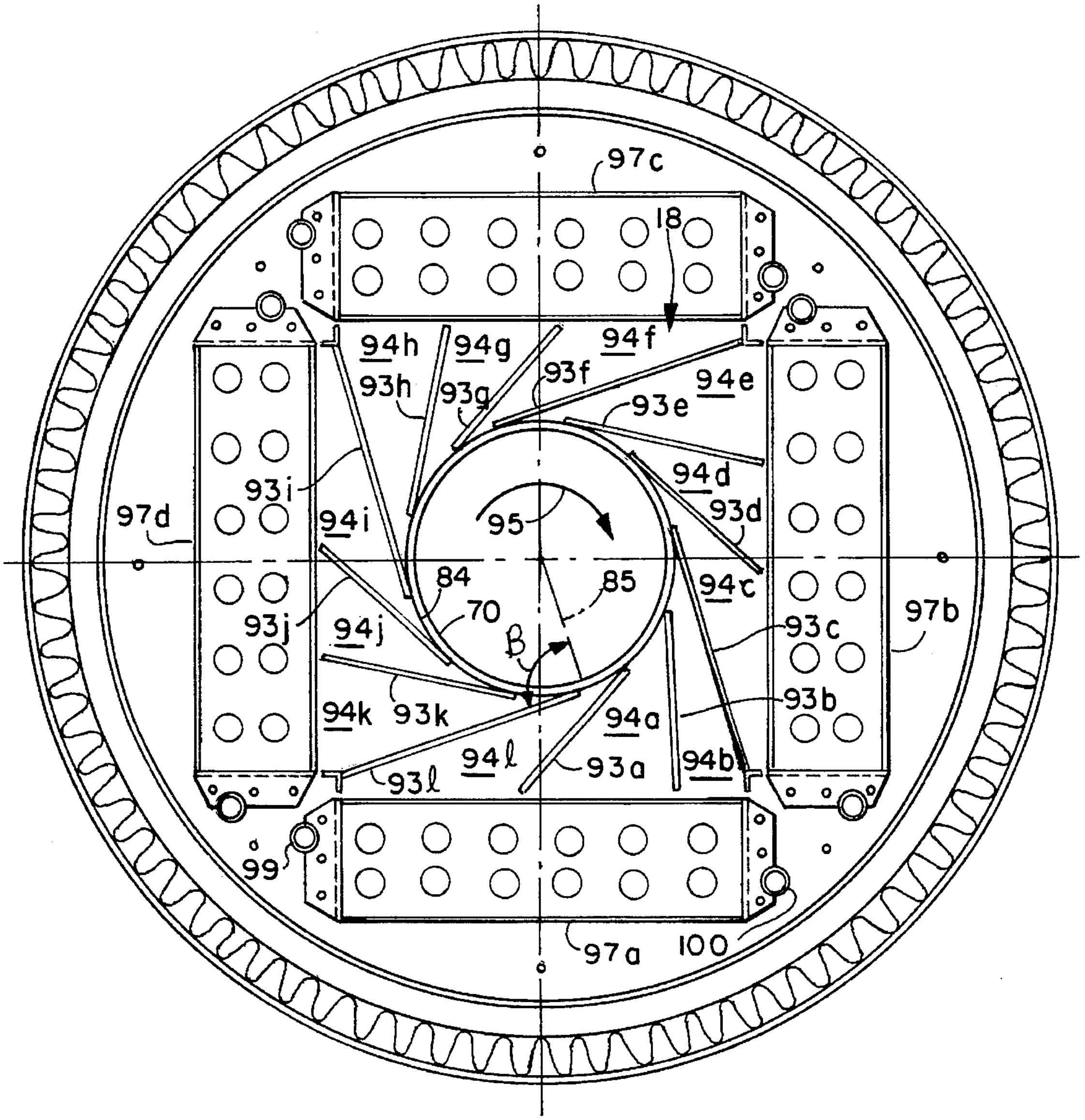
FIG. 4 is a schematic, cross-sectioned view of the diffuser of the present invention taken along lines 4—4 of FIG. 2.

Adjacent plenum plate 64 and longitudinally extending between plenum plate 64 and circular end plate 67 is a first fixed fan diffuser 80 (best shown in FIGS. 2 and 3) while adjacent circular end plate 67 and longitudinally extending between plenum plate 64 and end plate 67 is a second fixed fan diffuser 81 (best shown in FIGS. 2 and 4).

As best shown in FIG. 3, first fixed fan diffuser 80 includes a plurality of first vanes 83 which are spaced at equal circumferential increments about underpressure central opening 70 (which in turn is shown for reference purposes as reference numeral 70 in FIG. 3). First vanes 83 extend longitudinally (FIG. 1) a fixed distance from plenum plate 64. More specifically, each first vane 83 extends in a first direction radially outwardly from an imaginary circle shown in phantom line in FIG. 3 and designated by reference numeral 84. In the preferred embodiment, imaginary circle 84 has a diameter larger than that of central underpressure opening 70 although the diameter of imaginary circle 84 could be reduced to be equal to that of central underpressure opening 70. As noted, first vanes 83 are spaced at equal, circumferential increments about imaginary circle 84 and extend radially outwardly from imaginary circle 84. In the preferred embodiment there are twelve (12) first vanes designated **83*a*–83*l* with each vane spaced then at 30° from its adjacent vane. Further, each vane 83 forms with the radius (designated by reference numeral 85) of imaginary circle 84 an included angle shown as A in FIG. 3. Included angle A is 90° or less and in the preferred embodiment is set at 85° for first diffuser 80. It is of course appreciated that first vanes 83 are fixed in the positions just described by being welded at their axial or longitudinal ends to diffuser end plates 86, 87 with diffuser end plate 86 affixed to plenum plate 64 and diffuser end plate 87 also functioning as the end plate for second fixed fan diffuser 81. With first vanes 83 fixed in their described positions, it can be appreciated that there is formed between any two adjacent vanes a first vane passageway 90, there being twelve (12) such first vane passageways (designated by reference numerals 90*a*–90*l*). Each vane passageway 90 increases in area as it radially extends outwardly from imaginary circle 84. It can be readily seen that if fan 62 rotates in the direction of arrow 91, wind mass will enter each vane passageway 90 and exit therefrom but if the rotation of fan 62 is reversed to be opposite to that of arrow direction 91, wind mass cannot enter vane passageways 90. In that event, the wind mass will travel longitudinally towards circular end plate 67 and enter second fixed fan diffuser 81**.

Referring now to FIGS. 2 and 4, second fixed fan diffuser 81 has an arrangement and construction similar to that described for first fan diffuser 81. There is a plurality of second vanes 93 circumferentially spaced about imaginary circle 84 and extending radially outwardly therefrom. More specifically as with first fan diffuser 80 there are twelve (12)

second vanes designated as 93*a*–93*l* spaced at 30° increments and forming twelve (12) second vane passageways 94, each vane passageway individually designated 94*a*–94*l*. However, each second vane 93 extends in a radially outwardly direction from imaginary circle 84 opposite to the direction in which the first vanes 83 extend radially outwardly from imaginary circle 84. Also, in the preferred embodiment the included angle designated as B is set at 90° so that second vanes 93 are tangential to imaginary circle 84. The second vanes 93 are fixed in the position shown by being welded or secured to end plate 87 at one axial end and circular end plate 67 at their opposite axial end. In the position thus described and as shown in FIG. 4, when fan 62 rotates in the direction of arrow 95 (i.e. clockwise) which is opposite to that of arrow 91 (i.e. counterclockwise) the wind mass generated by fan 62 enters second vane passageways 94 and exits therefrom. If the rotation of fan 62 was reversed from that shown by arrow 95, the wind mass would be blocked from entry into second vane passageways 94. Thus, depending on the direction of rotation of fan 62, the wind mass developed by fan 62 will either enter and exit first vane passageways 90 or second vane passageways 94.

Accordingly, it now becomes possible to provide a cooling arrangement for one of the first or second fixed fan diffusers 80, 81 over which the wind mass is to be passed so that selective cooling can be achieved by simply establishing fan rotation in one direction or the other. In the preferred embodiment this is achieved by placing four (4) cooling manifolds 97*a*–97*d* in fluid communication with the outlets of second vane passageways 94 (although one circular cooling manifold could also be used). Each manifold 97 has a coil 98 with cooling inlet 99 and a cooling outlet 100 for a liquid coolant such as water to enter and exit each manifold, it being understood that coolant coil 98 is formed to extend within and fill the space of the manifold. Additionally, swirl vanes 103 are added to the exit side of manifolds 97 to insure that the cooled wind mass will swirl about the circumferential wall of heat treat chamber 30. Because of the pressure drop of the wind mass as it passes through the cooling coils within cooling manifolds 97, the length of the longitudinal distance which second vanes 93 extend is sized to be greater than longitudinal distance of first vanes 83. Also, more wind mass is required for cooling. In the preferred embodiment the longitudinal distance of second vanes 93 is twice that of first vanes 83. This is necessary to obtain cooling rates of 250° F./minute through the range of 2200° F –1200° F. Significantly, coolant is circulated through coils 98 continuously during both the heating and cooling phases. Thus, coils 98 are not subjected to thermal shock which would otherwise occur if a cold coolant was introduced into coils 98 after work 35 and heat treat chamber 30 was at high temperatures in excess of 1850°–1900° F. This is made possible in the present invention because wind mass does not flow through second fixed fan diffuser 81 during heating so there is no interference with the heating cycle. In theory, because coolant is flowing through coils 98, there is some tendency of coils 98 to act as a heat sink. In practice, this has not been shown to detrimentally interfere with heating of work 35 either by convection at low temperatures of up to about 1200° F. or at the high temperature range of 1800°–2200° F. achieved by radiation heating. It should be noted that manifolds 97 are placed in plenum chamber 75 which is shielded from work 35 and that manifolds 97 are placed in second fixed fan diffuser 81 at the rear of furnace 10 thus minimizing any detrimental heat sink effect on heating of work 35. In summary, by placing coils 98 within plenum chamber 35, a very simple, inexpensive cooling arrangement is made possible which is extremely efficient because of the wind mass pattern produced.

OPERATION

In its simplest operation, fan 62 is rotated in the direction of arrow 91 and heat is supplied from the resistance heating configuration 48 to heat work 35 by convection to temperatures of about 1000°–1200° F. The wind mass developed within heat treat chamber 30 is an inert gas at a standard atmospheric pressure of about 1 bar after the chamber has been initially evacuated by vacuum pump 38. When work 35 reaches this temperature, fan 62 is rotated in the opposite direction of rotation arrow 95 and a coolant flows within cooling coils 98 within manifold 97 at which time the wind mass temperature is reduced since the wind mass passes over cooling coils 98. Accordingly, the temperature of the work is reduced. The aforementioned cycle is generally a temper cycle and microprocessor controller 40 in the preferred embodiment controls the direction of rotation of fan 62, the current (and the heat) inputted to resistance heating element configuration 48, and the flow of coolant through coils 92. (Also, within the scope of the present invention microprocessor 40 controls the speed of fan 62 and the pressure within heat treat chamber 30.) With respect to the cooling portion of the cycle, it should be noted that the electric resistance heating configuration 48 can be shut off and that by cycling the fan rotation from clockwise to counterclockwise, it is possible to switch the cooling medium from a "furnace cool" to a "quench" as the wind mass is cycled between first and second fan diffuser 80, 81 and in this manner a very accurate rate of cooling of the work can be obtained. It is also possible to cycle fan 62 rotation from a furnace heat to a furnace quench or to a furnace atmosphere cool mode.

However, one of the main features of the invention is the ability of furnace 10 to accomplish high temperature heat treat processes which employ or require an interrupted quench such as marquenching and austempering. Furnace 10 will operate in somewhat the same fashion as conventional vacuum furnaces. Essentially the process will include the steps of actuating vacuum pump 38 to evacuate heat treat chamber 30. That is, furnace chamber is basically purged of any furnace gases by simply initially drawing a slight vacuum in an initial purge step. Then, process gas 41, i.e. an inert gas, is used to back fill heat treat chamber 30. When heat treat chamber 30 is back filled with an inert gas the pressure within the heat treat chamber rises to a standard atmospheric pressure i.e. 1 bar. At this time, in the preferred embodiment, work 35 is initially heated to a low temperature by actuating fan 62 to rotate in a direction of first arrow rotation 91 while actuating heating element configuration 48. This will result in heating the work to an initial low end temperature of about 1000°–1200° F. principally by convection in the manner described in detail in the '091 and '782 Background Patents. However, in accordance with the present invention, the pressure of the furnace atmosphere can be regulated by varying the pressure of process gas 41 under control of microprocessor controller 40 to densify the gas and increase convective cooling. When the work reaches this low pre-heat temperature, the inert gas is drawn out of heat treat chamber 30 by vacuum pump 38. Note that the inert gas acts as a purge gas and when it is withdrawn, heat treat chamber 30 is free or purged of any foreign gases. With heat treat chamber 30 under a vacuum which can be anywhere between 0.001 and 10 torr, resistance heating element configuration 48 acts to raise the temperature of work 35 to the high temperatures of approximately 2000°–2200° F. by radiant heat flux as described above.

When this temperature is reached, process gas 41 is backfilled into heat treat chamber 30 and pump 38 is actuated to establish a positive pressure within heat treat chamber 30 of as high as 10 bar absolute pressure. At this time, controller 40 is actuated to rotate fan 62 in the second arrow rotation direction 95 to force the wind mass developed by fan 62 through second fan diffuser 81 and thus pass over cooling coils 98. In this mode work 35 is quenched relatively rapidly (with rates as high as 250° F./minute in the temperature range of 2200° F to 1200° F.). Now the quench rate can be varied by simply varying the pressure and thus the density of the furnace cooling atmosphere gas by microprocessor controller 40 regulating the pressure of process gas 41. It is recognized that others have used gases at multi-bar varying pressures as high as about 6 bar to control the rate of cooling so that this step in itself is not novel. Also, at least one known system has circulated the multi-bar atmosphere over cooling coils physically situated within the furnace. However, it is not believed that anyone has used multi-bar atmospheres in the simple and efficient arrangement of the present invention. Also, in accordance with the scope of the invention, the speed of fan 62 can be varied. It is to be recognized that with the furnace gas atmosphere at a ten fold density, fan motor torque starts fan 62 slow and keeps fan speeds moderate. However, the invention contemplates use of a fan motor size sufficient to develop high velocity wind patterns which can be varied by controller 40 to further control the cooling (and by extension heating) rates. When work 35 is cooled to a temperature at which the quench is to be interrupted (i.e. the isothermal transformation phase, for example, 1000° F.), the pressure of the gas within the furnace could be relieved. If this is insufficient or alternatively, in lieu thereof, rotation of fan 62 can be simply stopped. Thereafter, the temperature of work 35 can be maintained at the interrupted quench temperature by simply throttling rotation of fan 62 so that it alternately switches the flow of the wind mass between first and second fan diffusers 80, 81. Depending on what temperature is sensed by work thermocouple 43, microprocessor controller 40 can actuate electric resistance heating configuration 48 to maintain work 35 at the interrupted quench temperature. With the present invention, in theory, four (4) modes (other than gas pressure relief) can be used to maintain work 35 at its interrupted quench temperature:

(a) rotation of fan 62 stopped (which is not preferred, if fan rotation is stopped for very long);

(b) fan 62 rotation through second fixed fan diffuser 81 for gas quenching;

(c) fan 62 rotation through first fan diffuser 80 with heating elements 48 off for furnace atmosphere cooling; and (d) fan 62 rotation through first fan diffuser 80 with heating elements 48 actuated.

Importantly, microprocessor controller 40 can instantaneously cause furnace 10 to shift between any of the four (4) modes and thus maintain a very close, precise and accurate regulation of the cooling portion of any heat treat cycle. This permits furnace 10 to perform heat treat processes requiring interrupted quenches as well as heat treat processes in which the cooling required by the process has to be accurately and precisely controlled. Furthermore, because of the high injection pressures of the inert gas (coupled with the variable speed of fan rotation), high gas quenching rates can be achieved and those rates can be controlled to match the desired heat treat cooling process curve.

The invention has been described with reference to a preferred embodiment. Alterations and modifications will occur to those skilled in the art upon reading and understanding the detailed description of the invention set forth herein. It is intended to include all such modifications and alterations insofar as they come within the scope of the present invention.

Having thus described the invention, it is claimed:

1. An industrial heat treat furnace comprising:

a. an elongated heat treat chamber defined by furnace walls into which work to be heat treated is placed, said heat treat chamber having a forward end and a closed rearward end;

b. a plenum plate suspended within said heat treat chamber adjacent said rearward end to define a plenum chamber extending between said plate and said rearward end, said plate having a central underpressure opening and an outer edge spaced inwardly from one of said furnace walls to define an exit space therebetween, said central opening and said exit space in fluid communication with said plenum chamber and said heat treat chamber;

c. a fan within said plenum chamber adjacent said central opening;

d. motor means to rotate said fan clockwise and counter clockwise for creating a wind mass swirling in a first direction and in a second direction opposite to said first direction;

e. first stationary fan diffuser means adjacent said plate for directing said wind mass from said plenum chamber through said exit space when said motor means rotates said fan in said first direction while preventing said wind mass from traveling through said first diffuser means when said motor means rotates said fan in said second direction; and f. second stationary fan diffuser means adjacent said rearward end for directing said wind mass from said plenum chamber through said exit space when said motor means rotates said fan in said second direction while preventing said wind mass from traveling through said second diffuser means when said motor means rotates said fan in said first direction.

2. The furnace of claim 1 further including:

heating means to heat said wind mass; cooling means to cool said wind mass; and means to selectively actuate said heating means when said motor means rotates said fan in a first direction whereby said work is heated and to actuate said cooling means when said motor means rotates said fan in said second direction whereby said work is cooled.

3. The furnace of claim 2 wherein said heat treat chamber is cylindrical and is defined by a cylindrical furnace wall, a sealable door adjacent said forward end and a rearward wall at said rearward end;

and said plenum plate and said central underpressure opening is circular so that said exit space is annular in configuration.

4. The furnace of claim 3 wherein said first diffuser means includes a plurality of first vanes spaced at circumferential increments about said underpressure opening and extending longitudinally a fixed distance from said plenum plate, each first vane extending in a first direction from the circumference of an imaginary circle concentric with the edge of said central underpressure opening and radially outwardly therefrom to define between each pair of adjacent first vanes a first diffuser vane passageway, each first vane passageway increasing in area as said vane passage-way extends radially outwardly from said imaginary circle whereby said wind mass flows through and out of said first vane passageways when said fan is rotated in said first direction while said wind mass is blocked from flowing through said first vane passageways when said fan is rotated in a direction opposite to said first direction.

5. The furnace of claim 4 wherein said second diffuser means includes a plurality of second vanes spaced at circumferential increments about said underpressure opening and extending longitudinally a fixed distance from said rearward wall to said first vanes, each second vane extending in a second direction opposite to that of said first vane's first direction from the circumference of said imaginary circle and radially outwardly therefrom to define between each pair of adjacent second vanes a second diffuser vane passageway, each second vane passageway increasing in area as said second vane passageway extends radially outwardly from said imaginary circle whereby said wind mass flows through said second vane passageways when said fan is rotated in said second direction while said wind mass is blocked from flowing through said second vane passageways when said fan is rotated in said first direction opposite to the direction of said second vanes

6. The furnace of claim 5 wherein each vane forms an included angle with the radius of said imaginary circle which is not greater than 90°.

7. The furnace of claim 5 wherein each vane passageway has an inlet adjacent said imaginary circle and an outlet, at least one manifold in fluid communication with the outlets of several second vane passageways and extending radially outwardly from said second vane passageways, and at least one cooling coil within said manifold whereby said wind mass is cooled as it passes over said cooling coil when leaving said second vane passageways.

8. The furnace of claim 7 wherein the distance which said second vanes longitudinally-extend is about twice the longitudinal distance over which said first vanes extend whereby the wind mass flow through said second vane passageways is at least equal to the wind mass flow of said wind mass through said second vane passageways.

9. The furnace of claim 5 wherein said fan has a forward end and a rearward end, said forward adjacent but slightly spaced from said plenum plate whereby non-turbulent return of the wind mass through said central opening is enhanced.

10. The furnace of claim 1 further including within said heat treat chamber a plurality of curved graphite heating elements electrically connected to one another to form a continuous circle surrounding and equidistantly spaced about said work, there being a plurality of graphite heating element circles at equally spaced longitudinal increments along said heat treating chamber;

electrical power means providing electrical current to said heating elements for heating said work; and vacuum means for selectively drawing a vacuum in said furnace chamber.

11. The furnace of claim 10 further including an open ended cylindrical furnace casing, a closed rearward end furnace casing secured to one end of said cylindrical casing; door means affixed to the opposite end of said cylindrical casing for providing access to the interior of said heat treat chamber and conventional furnace fibrous insulation attached to the interior of said cylindrical furnace casing and to said rearward end plate and to said door means for insulating said furnace chamber.

12. The furnace of claim 11 further including means to supply a process gas to the interior of said further at atmosphere as high as 10 bar and means to variably control the pressure of said process gas within said furnace whereby a hot wall furnace functions as a multi-bar furnace.

13. In a process for heat treating metal work in a cylindrical furnace having a heat treat chamber containing the work, a circular plenum plate suspended within said chamber adjacent the rearward end of said chamber to define an exit space between said plate's outer edge and said chamber, said plate having a central underpressure opening and a fan between said plate and said rearward end for generating a wind mass, said furnace also having means for heating said work and means for cooling said wind mass, said process including the steps of:

(a) providing first and second fixed fan diffusers extending radially outwardly from said central underpressure opening and extending longitudinally between said plate and said rearward end, said first diffuser adjacent said plate and having first vane passageways permitting a wind mass when swirling in a first direction to enter and exit said first vane passageways while preventing flow therethrough when said wind mass swirls in an opposite second direction; said second diffuser adjacent said rearward end and having second vane passageways permitting said wind mass when swirling in a second direction opposite to said first direction to enter and exit said second vane passageways while preventing flow therethrough when said wind mass swirls in said first direction and at least one cooling coil in fluid communication only with at least one of said second vane passageways;

(b) rotating said fan in a first direction while actuating said heat means to cause said wind mass to flow through said first diffuser while blocking said wind mass from entry into said second diffuser, the pressure of said wind mass caused by the rotation of said fan being sufficient to cause said wind mass to pass through the annular exit space between the circumferential edge of said plate and the wall of said heat treat chamber, enter said heat treat chamber to convectively heat work therein to a temperature of about 1000° to 1200° F. and be thereafter withdrawn from said heat treat chamber by exiting through said central underpressure opening; and, thereafter (c) rotating said fan in said second direction while actuating said cooling means to cause said wind mass to flow through said second diffuser while being blocked from flowing through said first diffuser for quenching said work; said wind mass being cooled by passing said wind mass over said cooling coil when leaving said second diffuser and the pressure of said wind mass caused by the rotation of said fan being sufficient to cause said wind mass to pass through said annular exit space, enter said heat treat chamber to convectively cool said work and be withdrawn therefrom through said central underpressure opening.

14. The heat treat process of claim 13 further including the step after step (b) of stopping said fan rotation and (d) radiantly heating said work to temperatures in excess of said 1000° to 1200° F. prior to performing step (c).

15. The heat treat process of claim 14 further including the steps of prior to performing step (b), drawing a vacuum within said heat treat chamber, backfilling said heat treat chamber with an inert gas while allowing said vacuum within said heat treat chamber to be reduced to levels up to about atmospheric pressure of approximately 1 Bar absolute followed by performing step (b); and, then evacuating said heat treat chamber to a predetermined level followed by performing step (d) and thereafter backfilling said heat treat chamber with a furnace atmosphere gas injected under pressure as high as 10 bar absolute to said heat treat chamber followed by completing step (c) during which said fan is rotated at a speed sufficient with the injection pressure of said atmospheric gas to cause said heat treat chamber to have atmosphere pressures whereby high quenching rates occur.

16. The heat treat process of claim 15 wherein quench step (d) is interrupted to maintain said work at a predetermined temperature by sensing the temperature of said work and stopping said fan rotation in said second direction when said predetermined temperature is sensed and thereafter switching fan rotation between said first and second directions to maintain said work at said predetermined, interrupted quench temperature whereby said work can be quenched with minimal thermal distortion.

17. The heat treat process of claim 15 wherein the pressure of said atmosphere gas is varied during quenching to obtain a desired quench rate.

18. In a heat treat furnace for heat treating metal work, said furnace having a cylindrical heat treat chamber with a door sealed forward end and a closed rearward end and a plenum plate suspended within said heat treat chamber, said plate having a central, underpressure opening and defining an exit space between its' outer edge and said heat treat chamber, a fan between said plenum plate and said rearward end, the improvement comprising:

a first, stationary fan diffuser adjacent said plenum plate permitting wind mass generated by said impeller to travel therethrough when said fan is rotated in a first direction while blocking flow of wind mass when said fan is rotated in a second opposite direction;

a second, stationary fan diffuser adjacent said rearward end permitting said wind mass generated when said fan is rotated in said second direction to travel through said second fan diffuser while blocking flow of said wind mass when said fan is rotated in said first direction; and cooling coil means associated with one of said first and second diffusers for passing said wind mass over said cooling coils when leaving said one of said diffusers for cooling said wind mass.

19. The furnace of claim 18 wherein said cooling coil means is positioned adjacent said second fan diffuser.

20. The furnace of claim 19 wherein said first diffuser means includes a plurality of first vanes spaced at circumferential increments about said underpressure opening and extending longitudinally a fixed distance from said plenum plate, each first vane extending in a first direction from the circumference of an imaginary circle concentric with the edge of said central underpressure opening and radially outwardly therefrom to define between each pair of adjacent first vanes a first diffuser vane passageway, each first vane passageway increasing in area as said vane passageway extends radially outwardly from said imaginary circle whereby said wind mass flows through and out of said first vane passageways when said fan is rotated in said first direction while said wind mass is blocked from flowing through said first vane passageways when said fan is rotated in a direction opposite to said first direction.

21. The furnace of claim 20 wherein said second diffuser means includes a plurality of second vanes spaced at circumferential increments about said underpressure opening and extending longitudinally a fixed distance from said rearward wall to said first vanes, each second vane extending in a second direction opposite to that of said first vane's first direction front the circumference of said imaginary circle and radially outwardly therefrom to define between each pair of adjacent second vanes a second diffuser vane passageway, each second vane passageway increasing in area as said second vane passageway extends radially outwardly from said imaginary circle whereby said wind mass flows through said second vane passageways when said fan is rotated in said second direction while said wind mass is blocked from flowing through said second vane passageways when said fan is rotated in said first direction opposite to the direction of said second vanes.

22. The furnace of claim 21 wherein each vane forms an included angle with the radius of said imaginary circle which is not greater than 90°.

23. The furnace of claim 22 wherein each vane passageway has an inlet adjacent said imaginary circle and an outlet, at least one manifold in fluid communication with the outlets of several second vane passageways and extending radially outwardly from said second vane passageways, and at least one cooling coil within said manifold whereby said wind mass is cooled as it passes over said cooling coil when leaving said second vane passageways.

24. The furnace of claim 23 wherein the distance which said second vanes longitudinally-extend is about twice the longitudinal distance over which said first vanes extend.

25. The furnace of claim 18 wherein said fan has a forward end and a rearward end, said forward adjacent but slightly spaced from said plenum plate whereby non-turbulent return of the wind mass through said central underpressure opening is enhanced.

26. The furnace of claim 18 further including within said heat treat chamber a plurality of curved graphite heating elements electrically connected to one another to form a continuous circle surrounding and equidistantly spaced about said work, there being a plurality of graphite heating element circles at equally spaced longitudinal increments along said heat treating chamber;

electrical power means providing electrical current to said heating elements for heating said work; and vacuum means for selectively drawing a vacuum in said furnace chamber.

* * * * *